(12) United States Patent
Litvinov

(10) Patent No.: US 9,967,481 B2
(45) Date of Patent: May 8, 2018

(54) TECHNIQUES FOR IMAGE SENSOR PIXEL CORRECTION

(71) Applicant: Intel Corporation, Santa Clara, CA (US)

(72) Inventor: Anatoly Litvinov, Binyamina (IS)

(73) Assignee: INTEL CORPORATION, Santa Clara, CA (US)

( * ) Notice: Subject to any disclaimer, the term of this patent is extended or adjusted under 35 U.S.C. 154(b) by 36 days.

(21) Appl. No.: 13/802,378

(22) Filed: Mar. 13, 2013

(65) Prior Publication Data

US 2014/0270570 A1 Sep. 18, 2014

(51) Int. Cl.
 H04N 5/357 (2011.01)
 H04N 5/367 (2011.01)

(52) U.S. Cl.
 CPC ........... *H04N 5/357* (2013.01); *H04N 5/3675* (2013.01)

(58) Field of Classification Search
 USPC ......................................................... 382/275
 See application file for complete search history.

(56) References Cited

U.S. PATENT DOCUMENTS

| | | | | |
|---|---|---|---|---|
| 5,598,184 A * | 1/1997 | Barkans | .................. | H04N 19/90 345/597 |
| 5,768,490 A * | 6/1998 | Hersch | .................... | B41B 19/00 345/467 |
| 6,104,839 A * | 8/2000 | Cok et al. | ...................... | 382/254 |
| 6,545,715 B1 * | 4/2003 | Na | .................................. | 348/351 |
| 6,584,413 B1 * | 6/2003 | Keenan et al. | .................. | 702/28 |
| 7,580,589 B2 * | 8/2009 | Bosco | ........................ | G06T 5/20 382/260 |
| 7,949,200 B2 * | 5/2011 | Oshikiri | .................. | G06T 5/002 382/260 |
| 8,599,439 B2 * | 12/2013 | Yu | ............................. | G06T 5/20 358/1.15 |
| 8,767,117 B2 * | 7/2014 | Miyashita | .......... | H04N 5/23212 348/246 |
| 9,014,461 B2 * | 4/2015 | Hayashida | ............ | G06T 7/0012 378/132 |
| 2002/0039139 A1 * | 4/2002 | Hsu et al. | ...................... | 348/222 |
| 2004/0169746 A1 * | 9/2004 | Chen et al. | ................... | 348/246 |

(Continued)

OTHER PUBLICATIONS

Li, Jim S. Jimmy, and Sharmil Randhawa. "Adaptive order-statistics multi-shell filtering for bad pixel correction within CFA demosaicking." TENCON 2009-2009 IEEE Region 10 Conference. IEEE, 2009.*

(Continued)

*Primary Examiner* — Michelle M Hausmann

(57) ABSTRACT

Techniques for image sensor pixel correction are described. In one embodiment, for example, an apparatus may comprise a processor circuit and an imaging management module, and the imaging management module may be operable by the processor circuit to determine an intensity value for a pixel in an image sensor pixel array, determine a pixel intensity deviation for the pixel comprising a difference between the intensity value for the pixel and a composite intensity value for a pixel neighborhood of the pixel, determine a pixel correction threshold for the pixel, and when the pixel intensity deviation exceeds the pixel correction threshold, determine a corrected intensity value for the pixel. Other embodiments are described and claimed.

25 Claims, 7 Drawing Sheets

(56) References Cited

U.S. PATENT DOCUMENTS

| | | | |
|---|---|---|---|
| 2006/0115121 A1* | 6/2006 | Saka et al. | 382/104 |
| 2007/0146729 A1* | 6/2007 | Emtman et al. | 356/614 |
| 2007/0285552 A1* | 12/2007 | Kim | 348/335 |
| 2008/0012967 A1* | 1/2008 | Kuwabara | 348/246 |
| 2008/0024832 A1* | 1/2008 | Kao | H04N 1/401 358/452 |
| 2008/0095242 A1* | 4/2008 | Lim et al. | 375/240.24 |
| 2008/0151080 A1* | 6/2008 | Osaka et al. | 348/241 |
| 2008/0158396 A1* | 7/2008 | Fainstain et al. | 348/246 |
| 2008/0292207 A1* | 11/2008 | Kang | 382/274 |
| 2009/0021596 A1* | 1/2009 | Izume et al. | 348/222.1 |
| 2009/0087121 A1* | 4/2009 | Han | G06T 5/002 382/266 |
| 2010/0182660 A1* | 7/2010 | Mimoune | 358/518 |
| 2010/0208986 A1* | 8/2010 | Cobb et al. | 382/165 |
| 2011/0002384 A1* | 1/2011 | Mallat et al. | 375/240.12 |
| 2011/0058050 A1* | 3/2011 | Lasang et al. | 348/208.4 |
| 2013/0236095 A1* | 9/2013 | Hitomi | G06T 5/002 382/167 |

OTHER PUBLICATIONS

Bosco, A., et al. "Joint Gaussian noise reduction and defects correction in raw digital images." Signal Processing Symposium, 2004. NORSIG 2004. Proceedings of the 6th Nordic. IEEE, 2004.*

* cited by examiner

TECHNIQUES FOR IMAGE SENSOR PIXEL CORRECTION

TECHNICAL FIELD

Embodiments described herein generally relate to digital image processing, de-noising, and pixel value correction.

BACKGROUND

When an image sensor captures an image, the generated image data may be subject to various types of noise. In order to improve the quality of captured images, pixel correction techniques may be employed to correct for such effects. The determination of whether image data for a particular pixel requires correction may be based on whether that image data is representative of noise. This determination may in turn be based on a comparison of the image data for that particular pixel with image data for surrounding pixels.

DETAILED DESCRIPTION

Various embodiments may be generally directed to techniques for image sensor pixel correction. In one embodiment, for example, an apparatus may comprise a processor circuit and an imaging management module, and the imaging management module may be operable by the processor circuit to determine an intensity value for a pixel in an image sensor pixel array, determine a pixel intensity deviation for the pixel comprising a difference between the intensity value for the pixel and a composite intensity value for a pixel neighborhood of the pixel, determine a pixel correction threshold for the pixel, and when the pixel intensity deviation exceeds the pixel correction threshold, determine a corrected intensity value for the pixel. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
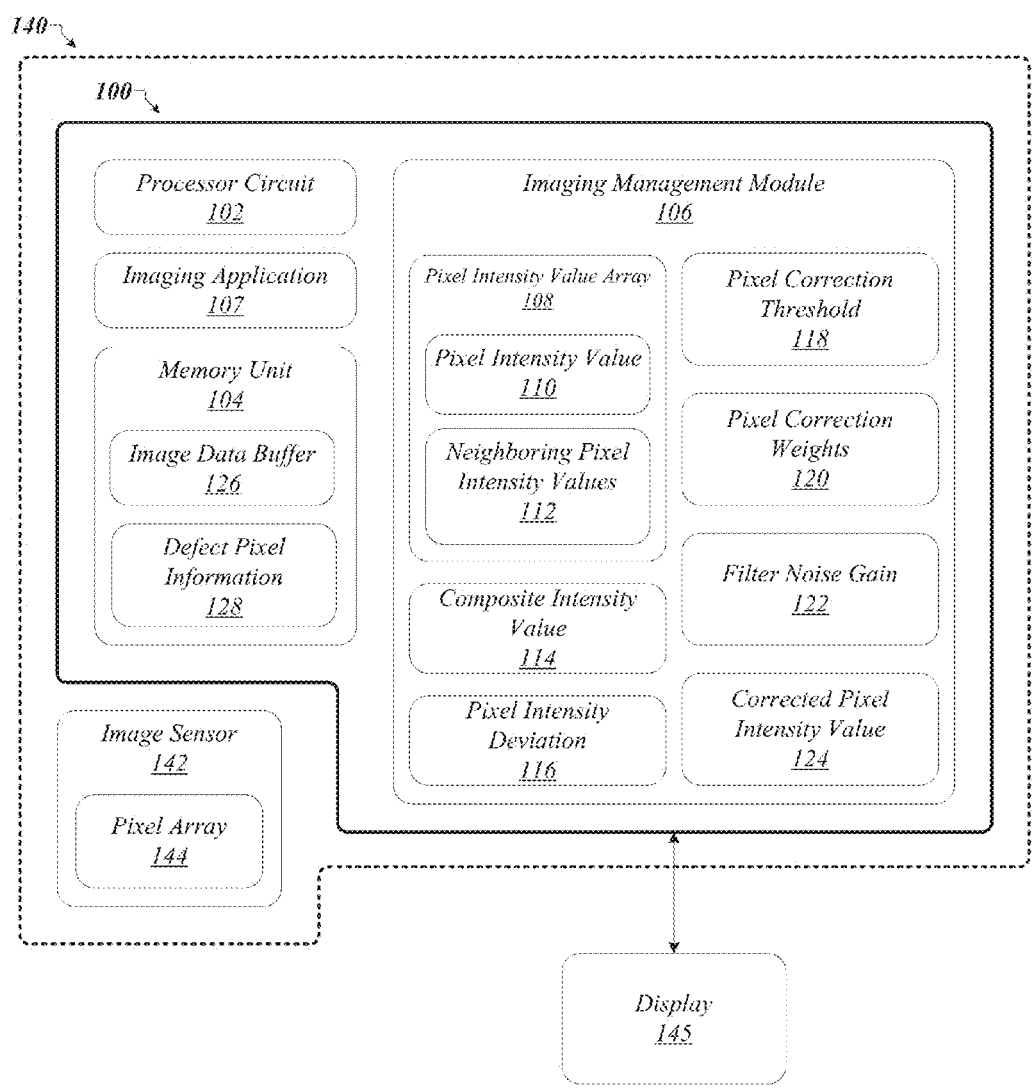
FIG. 1 illustrates one embodiment of an apparatus and one embodiment of a first system.

FIG. 1 illustrates a block diagram of an apparatus 100. As shown in FIG. 1, apparatus 100 comprises multiple elements including a processor circuit 102, a memory unit 104, and an imaging management module 106. The embodiments, however, are not limited to the type, number, or arrangement of elements shown in this figure.

In various embodiments, apparatus 100 may comprise processor circuit 102. Processor circuit 102 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 102 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 102 may be implemented as a general purpose processor, such as a processor made by Intel® Corporation, Santa Clara, Calif. The embodiments are not limited in this context.

In some embodiments, apparatus 100 may comprise or be arranged to communicatively couple with a memory unit 104. Memory unit 104 may be implemented using any machine-readable or computer-readable media capable of storing data, including both volatile and non-volatile memory. For example, memory unit 104 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 104 may be included on the same integrated circuit as processor circuit 102, or alternatively some portion or all of memory unit 104 may be disposed on an integrated circuit or other medium, for example a hard disk drive, that is external to the integrated circuit of processor circuit 102. Although memory unit 104 is comprised within apparatus 100 in FIG. 1, memory unit 104 may be external to apparatus 100 in some embodiments. The embodiments are not limited in this context.

In various embodiments, apparatus 100 may comprise an imaging management module 106. Imaging management module 106 may comprise logic and/or circuitry operative to receive, generate, process, analyze, modify, optimize, and/or transmit image data. In some embodiments, processor circuit 102 may be operative to execute an imaging application 107, and imaging management module 106 may be operative to perform one or more operations based on information, logic, data, and/or instructions received from imaging application 107. Imaging application 107 may comprise any application featuring image capture, generation, processing, analysis, and/or editing capabilities. In various embodiments, for example, imaging application 107 may comprise a digital image processing application. The embodiments are not limited to this example.

FIG. 1 also illustrates a block diagram of a system 140. System 140 may comprise any of the aforementioned elements of apparatus 100. System 140 may further comprise an image sensor 142. In various embodiments, image sensor 142 may comprise any device capable of capturing one or more images by converting light energy into image data corresponding to those images. Examples of image sensor 142 may include a complementary metal-oxide-semiconductor (CMOS) image sensor, a charge-coupled device (CCD) image sensor, and a hybrid CCD/CMOS image sensor, although the embodiments are not limited to these examples. In some embodiments, image sensor 142 may be comprised on or within an image capture device such as a digital camera. In various other embodiments, image sensor 142 may comprise a stand-alone device. In some embodiments, image sensor 142 may comprise a pixel array 144. Pixel array 144 may comprise an array of photosensors, each of which may be regarded as a pixel and may be operative to measure incident light of a particular color and/or wavelength. In various embodiments, one or more color separation components and/or techniques may be utilized within image sensor 142 in order to direct light of particular colors and/or wavelengths to particular pixels within pixel array 144 that are operative to measure those particular colors and/or wavelengths. For example, in some embodiments, image sensor 142 may comprise a Bayer filter mosaic that directs green, red, and blue light to respective pixels of pixel array 144. The embodiments are not limited in this context.

In some embodiments, apparatus 100 and/or system 140 may be configurable to communicatively couple with a display 145. Display 145 may comprise any display device capable of displaying information received from processor circuit 102. Examples for display 145 may include a television, a monitor, a projector, and a computer screen. In one embodiment, for example, display 145 may be implemented by a liquid crystal display (LCD), light emitting diode (LED) or other type of suitable visual interface. Display 145 may comprise, for example, a touch-sensitive color display screen. In various implementations, display 145 may comprise one or more thin-film transistors (TFT) LCD including embedded transistors. In various embodiments, display 145 may be arranged to display a graphical user interface operable to directly or indirectly control imaging application 107. For example, in some embodiments, display 145 may be arranged to display a graphical user interface generated by imaging application 107. In such embodiments, the graphical user interface may enable operation of imaging application 107 to receive, generate, process, analyze, modify, optimize, and/or transmit image data. The embodiments are not limited in this context.

In general operation, apparatus 100 and/or system 140 may be operative to process image data. In various embodiments, for example, apparatus 100 and/or system 140 may be operative to process pixel intensity value array 108, which may comprise pixel intensity values generated by image sensor 142 based on light measurements provided by pixel array 144. In some embodiments, apparatus 100 and/or system 140 may be operative to perform pixel value correction on pixel intensity value array 108. The embodiments are not limited in this context.

In various embodiments, image sensor 142 may be operative to capture an image by generating pixel intensity value array 108 based on light measurements provided by pixel array 144. For example, in some embodiments, image sensor 142 may be comprised within a digital camera, and a user may press an exposure button on the digital camera. Pixel array 144 may then be exposed to light passing through the aperture of the digital camera, and each of the pixels therein may be operative to measure light of a particular color and/or frequency. Based on these measurements, image sensor 142 may be operative to generate pixel intensity value array 108. Pixel intensity value array 108 may comprise a plurality of pixel intensity values. In various embodiments, each pixel intensity value in pixel intensity value array 108 may correspond to a particular pixel in pixel array 144. For any given pixel in pixel array 144, the pixel intensity value corresponding to that pixel may indicate an intensity of a particular color and/or frequency of light as measured by that pixel. The embodiments are not limited in this context.

Figure 2:
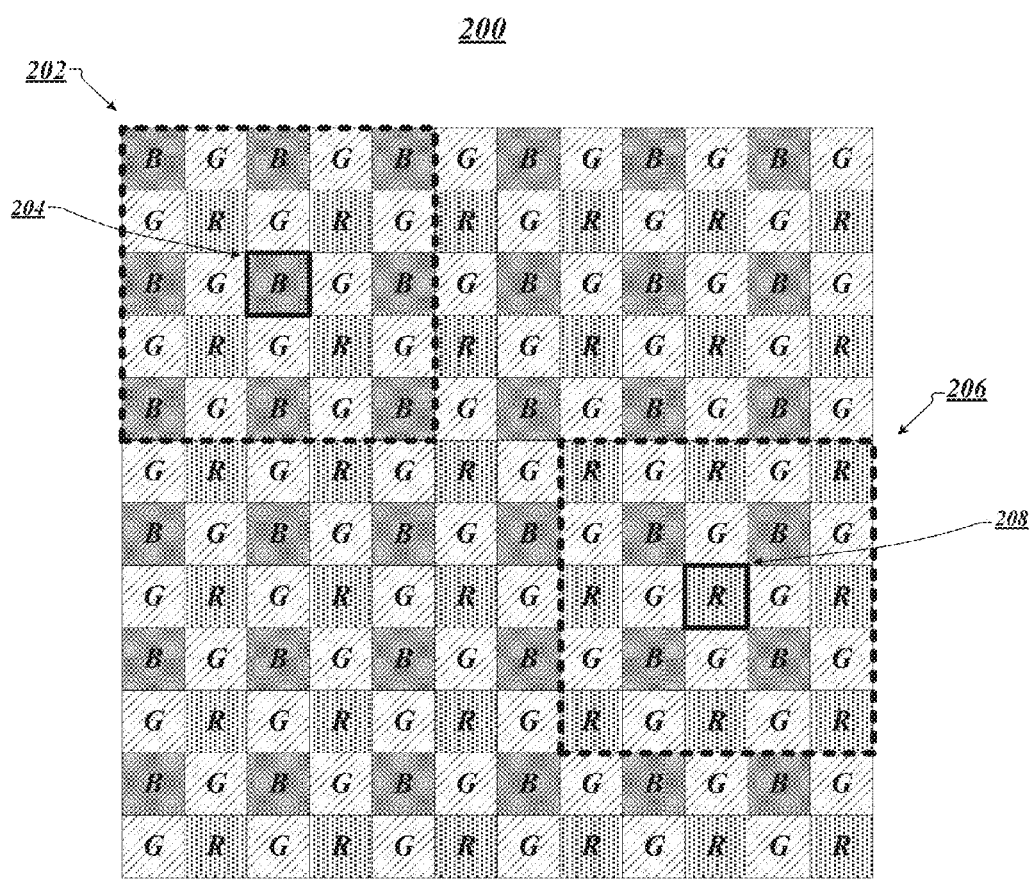
FIG. 2 illustrates one embodiment of an image sensor pixel array.

FIG. 2 illustrates a pixel array 202 that may comprise an example of pixel array 144 of FIG. 1 according to some embodiments. As shown in FIG. 2, pixel array 202 comprises a grid of pixels, each of which is operative to measure a particular color of light. In the example of pixel array 202, pixels operative to measure blue light are labeled "B," pixels operative to measure red light are labeled "R," and pixels operative to measure green light are labeled "G." For a given pixel, a pixel neighborhood may be defined that comprises a grid of pixels centered around that given pixel. For example, in FIG. 2, pixel neighborhood 202 is centered around pixel 204, and pixel neighborhood 206 is centered around pixel 208. For a particular pixel neighborhood, the pixels surrounding the central pixel may be defined as the neighboring pixels of the central pixel. For example, in FIG. 2, the neighboring pixels of pixel 204 comprise the remaining pixels comprised within pixel neighborhood 202. The embodiments are not limited to these examples and the pixel neighborhood may comprise more or less pixels and still fall within the described embodiments.

Returning to FIG. 1, in various embodiments, imaging management module 106 may be operative to perform pixel value correction on pixel intensity value array 108. In some embodiments, this may comprise an iterative process during each iteration of which a pixel intensity value in pixel intensity value array 108 is selected for evaluation and possible correction. For example, in various embodiments, imaging management module 106 may be operative to receive a pixel intensity value array 108 from image sensor 142 and to sequentially evaluate each pixel intensity value therein for possible correction. In various embodiments, imaging management module 106 may be operative to evaluate the pixel intensity values of pixel intensity value array 108 based on local luminosity estimates for the pixels of pixel array 144. For example, in some embodiments, imaging management module 106 may be operative to determine a pixel intensity value 110 for evaluation as a local luminosity estimate for a particular pixel. In other embodiments, imaging management module 106 may be operative to determine the pixel intensity value 110 for evaluation as the single pixel intensity value in pixel intensity value array 108 corresponding to that pixel in pixel array 144. In some embodiments, pixel intensity value array 108 may comprise raw image data, and imaging management module 106 may be operative to perform pixel value correction on pixel intensity value array 108 prior to demosaicing, tone mapping, gamma correction, and/or one or more digital image processing operations. An advantage of various embodiments may be that by performing pixel value correction prior to such operations, a reduction is achieved in the extent to which pixel value inaccuracies degrade the quality and/or accuracy of such subsequent operations. Other advantages may also be associated with the disclosed subject matter, and the embodiments are not limited in this context.

In some embodiments, following selection of a particular pixel intensity value 110 for evaluation, imaging management module 106 may be operative to determine a composite intensity value 114 describing neighboring pixel intensity values 112 associated with the pixel intensity value 110. Neighboring pixel intensity values 112 may comprise pixel intensity values for neighboring pixels of a pixel to which pixel intensity value 110 corresponds in pixel array 144. In various embodiments, imaging management module 106 may be operative to determine composite intensity value 114 based on neighboring pixel intensity values 112 for all neighboring pixels. For example, in some embodiments, composite intensity value 114 may comprise a local luminosity measurement for the pixel neighborhood of the pixel to which pixel intensity value 110 corresponds. In various other embodiments, imaging management module 106 may be operative to determine composite intensity value 114 based on neighboring pixel intensity values 112 only for neighboring pixels that measure a same color and/or wavelength as the pixel to which pixel intensity value 110 corresponds in pixel array 144. The embodiments are not limited in this context.

In some embodiments, imaging management module 106 may be operative to determine a pixel intensity deviation 116 based on pixel intensity value 110 and neighboring pixel intensity values 112. In various embodiments, imaging management module 106 may be operative to determine pixel intensity deviation 116 as a difference between pixel intensity value 110 and composite intensity value 114. For example, in some embodiments, imaging management module 106 may be operative to determine pixel intensity deviation 116 by subtracting pixel intensity value 110 from composite intensity value 114 and determining the absolute value of the result. In various embodiments, pixel intensity deviation 116 may comprise an indication of an extent to which pixel intensity value 110 differs from a value that might be expected based on neighboring pixel intensity values 112. The greater the value of pixel intensity deviation 116, the more likely it may be considered that pixel intensity value 110 represents noise rather than a true representation of the light incident upon its corresponding pixel in pixel array 144. The embodiments are not limited in this context.

In some embodiments, imaging management module 106 may be operative to determine a pixel correction threshold 118 for pixel intensity value 110. In various embodiments, pixel correction threshold 118 may comprise a value to which pixel intensity deviation 116 may be compared in order to determine whether pixel intensity value 110 is to be regarded as representing noise and thus as requiring noise correction. In some embodiments, pixel intensity value 110 may be considered to require noise correction when pixel intensity deviation 116 exceeds pixel correction threshold 118. In various embodiments, imaging management module 106 may be operative to determine a pixel correction threshold 118 for pixel intensity value 110 that is specific to pixel intensity value 110, based on specific parameters associated with pixel intensity value 110. In some embodiments, pixel intensity value 110 may itself comprise one of those parameters, such that the pixel correction threshold 118 for pixel intensity value 110 is in part a function of the magnitude of pixel intensity value 110. An advantage of various embodiments may be that by individually tailoring pixel correction threshold 118 to each particular pixel intensity value 110 in pixel intensity value array 108, the proportionality of shot noise to pixel intensity may be properly accounted for. As a result, stronger smoothing may be permitted in bright regions while detail is preserved in darker regions. In some embodiments, imaging management module 106 may be operative to determine pixel correction threshold 118 based also on the global digital and analog gains, white balance gains, and/or lens shading correction gains associated with pixel intensity value 110. In various embodiments, imaging management module 106 may be operative to determine pixel correction threshold 118 according to the equation:

$$\text{Threshold}_{i,j} = \alpha \cdot G_{i,j} + \beta \cdot \sqrt{I_{i,j} \cdot G_{i,j}} + c$$

where i and j represent a row and column number, respectively, of a pixel in pixel array 144, $G_{i,j}$ represents global analog and digital gain, white balance gain, and shading correction gain applied to that pixel prior to denoising, $I_{i,j}$ represents the pixel intensity value 110 for that pixel, $\alpha$ and $\beta$ represent coefficients that may vary depending on empirical properties of various implementations, and c represents a constant that may likewise vary. The embodiments are not limited in this context.

In some embodiments, when pixel intensity deviation 116 exceeds pixel correction threshold 118, imaging management module 106 may be operative to determine that correction is required for pixel intensity value 110 and to perform pixel value correction on pixel intensity value 110. In various embodiments, when pixel intensity deviation 116 does not exceed pixel correction threshold 118, imaging management module 106 may be operative to determine that correction is not required for pixel intensity value 110. The embodiments are not limited in this context.

In some embodiments, in order to perform pixel value correction on pixel intensity value 110, imaging management module 106 may be operative to determine pixel correction weights 120. In various embodiments, pixel correction weights 120 may comprise weights to be applied to neighboring pixel intensity values 112 in computing a weighted average of the pixel intensity values for the pixel neighborhood to which pixel intensity value 110 corresponds. In some embodiments, imaging management module 106 may be operative to determine pixel correction weights 120 only for neighboring pixel intensity values 112 associated with a same color and/or frequency of light as pixel intensity value 110. For example, if pixel intensity value 110 comprises a measured intensity of red light, imaging management module 106 may be operative to determine pixel correction weights 120 only for neighboring pixel intensity values 112 that are also measurements of red light. In various embodiments, imaging management module 106 may be operative to determine pixel correction weights 120 such that they are inversely proportional to the distance between their associated pixels and the pixel with which pixel intensity value 110 is associated. Thus, larger weights may tend to be applied to neighboring pixel intensity values 112 that correspond to pixels that are closer to that associated with pixel intensity value 110 than to neighboring pixel intensity values 112 that correspond to pixels that are more distant. The embodiments are not limited in this context.

In some embodiments, imaging management module 106 may be operative to determine a pixel correction weight 120 for pixel intensity value 110 or to forgo determining a pixel correction weight 120 for pixel intensity value 110 based on a determination of whether pixel intensity value 110 is associated with a defect pixel in pixel array 144. A defect pixel may comprise a pixel that is faulty in such a way that it consistently returns intensity measurements that are significantly higher or lower than those returned by its surrounding pixels. In various embodiments, imaging management module 106 may be operative to determine a pixel correction weight 120 for pixel intensity value 110 when it determines that pixel intensity value 110 does not correspond to a defect pixel, and to forgo determination of a pixel correction weight 120 for pixel intensity value 110 when it determines that pixel intensity value 110 corresponds to a defect pixel. The embodiments are not limited in this context.

In some embodiments, imaging management module 106 may be operative to determine whether pixel intensity value 110 corresponds to a defect pixel by examining previous pixel intensity values 110 corresponding to the same pixel and surrounding pixels in previous pixel intensity value arrays 108. For example, in various embodiments, memory unit 104 may comprise an image data buffer 126 that stores previous pixel intensity value arrays 108 corresponding to previously captured images. Imaging management module 106 may be operative to analyze this information to determine whether the pixel to which pixel intensity value 110 corresponds has consistently returned intensity measurements that were significantly higher or lower than those returned by its surrounding pixels. Additionally or alternatively, in some embodiments, memory unit 104 may comprise defect pixel information 128 that identifies pixels that have previously been identified as defect pixels. In such embodiments, imaging management module 106 may be operative to determine that a pixel to which pixel intensity value 110 corresponds is a defect pixel if it is identified in defect pixel information 128. The embodiments are not limited in this context.

In various embodiments, imaging management module 106 may be operative to reduce or eliminate pixel correction weights 120 for neighboring pixel intensity values 112 that appear to reflect noise themselves. For example, in some embodiments, imaging management module 106 may be operative to compare neighboring pixel intensity values 112 to composite intensity value 114, and to reduce or eliminate pixel correction weights 120 for neighboring pixel intensity values 112 that differ from composite intensity value 114 by amounts greater than pixel correction threshold 118. In various embodiments, when determining that a particular pixel correction weight 120 is to be reduced or eliminated, imaging management module 106 may be operative to redistribute that weight among the remaining pixel correction weights 120 rather than simply adding that weighting to that of pixel intensity value 110. In some embodiments, imaging management module 106 may be operative to redistribute the weight of a reduced or eliminated pixel correction weight 120 such that a filter noise gain 122 is approximately constant across a region of pixel array 144 in which the pixel neighborhood of pixel intensity value 110 resides. In various embodiments, the filter noise gain 122 may vary from region to region in pixel array 144. For example, pixel neighborhoods in a first region of pixel array 144 corresponding to a smooth region of pixel intensity value array 108 may exhibit an approximately constant filter noise gain 122 of around 0.35, while pixel neighborhoods in a second region of pixel array 144 corresponding to an edge region of pixel intensity value array 108 may exhibit an approximately constant filter noise gain 122 of around 0.50. The embodiments are not limited to these examples.

In various embodiments, imaging management module 106 may be operative to determine filter noise gain 122 for the pixel neighborhood of pixel intensity value 110 according to the equation:

$$FNG = \sqrt{\Sigma_i \Sigma_j w_{i,j}^2}$$

where FNG represents the filter noise gain 122 for any particular region and $w_{i,j}$ represents the pixel correction weight 120 for a neighboring pixel intensity value 112 corresponding to a pixel in an ith row and a jth column of that region. An advantage of some embodiments may be that by redistributing reduced or eliminated pixel correction weights 120 among those for other neighboring pixels and/or determining pixel correction weights 120 such that filter noise gain 122 is approximately constant, the sharpness of edge regions may be preserved. The embodiments are not limited in this context.

In various embodiments, imaging management module 106 may be operative to determine corrected pixel intensity value 122 based on neighboring pixel intensity values 112 and pixel correction weights 120. In some embodiments, imaging management module 106 may be operative to determine corrected pixel intensity value 122 as a weighted average of neighboring pixel intensity values 112 based on pixel correction weights 120. In various embodiments in which it has determined that pixel intensity value 110 does not correspond to a defect pixel, imaging management module 106 may be operative to include pixel intensity value 110 in the weighted average based on the pixel correction weight 120 determined for pixel intensity value 110. In some other embodiments in which it has determined that pixel intensity value 110 corresponds to a defect pixel, imaging management module 106 may be operative to exclude pixel intensity value 110 from the weighted average. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 3:
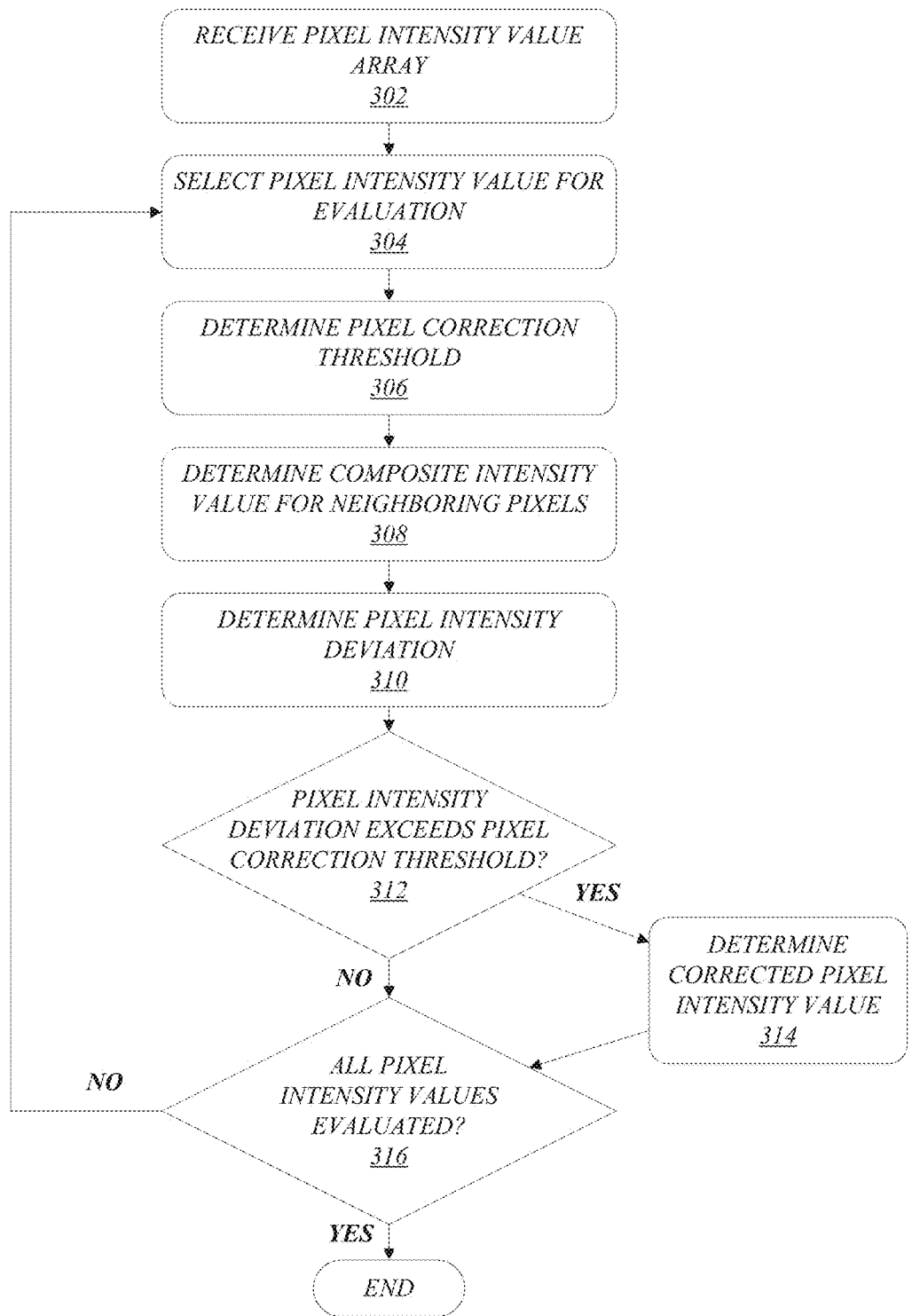
FIG. 3 illustrates one embodiment of a first logic flow.

FIG. 3 illustrates one embodiment of a logic flow 300, which may be representative of the operations executed by one or more embodiments described herein. More particularly, logic flow 300 may comprise an example of an iterative process for evaluating the pixel intensity values of a pixel intensity value array according to various embodiments. As shown in logic flow 300, a pixel intensity value array may be received at 302. For example, imaging management module 106 of FIG. 1 may be operative to receive pixel intensity value array 108. At 304, a pixel intensity value may be selected for evaluation from among the pixel intensity values in the received pixel intensity value array. For example, imaging management module 106 of FIG. 1 may be operative to select a pixel intensity value 110 within pixel intensity value array 108 for evaluation. At 306, a pixel correction threshold may be determined for the pixel intensity value. For example, imaging management module 106 of FIG. 1 may be operative to determine a pixel correction threshold 118 for pixel intensity value 110. At 308, a composite intensity value may be determined for neighboring pixels of the pixel with which the pixel intensity value corresponds. For example, imaging management module 106 of FIG. 1 may be operative to determine composite intensity value 114 based on neighboring pixel intensity values 112.

At 310, a pixel intensity deviation may be determined based on the pixel intensity value and the composite intensity value. For example, imaging management module 106 of FIG. 1 may be operative to determine pixel intensity deviation 116 based on pixel intensity value 110 and composite intensity value 114. At 312, it may be determined whether the pixel intensity deviation exceeds the pixel correction threshold for the pixel intensity value. For example, imaging management module 106 of FIG. 1 may be operative to determine whether pixel intensity deviation 116 exceeds the pixel correction threshold 118 for pixel intensity value 110. If it is determined that the pixel intensity deviation exceeds the pixel correction threshold, flow may pass to 314. At 314, a corrected pixel intensity value may be determined. For example, imaging management module 106 of FIG. 1 may be operative to determine a corrected pixel intensity value 124 to replace pixel intensity value 110. Flow may then pass to 316. If, at 312, it is determined that the pixel intensity deviation does not exceed the pixel correction threshold, flow may pass directly to 316. At 316, it may be determined whether all of the pixel intensity values in the pixel intensity value array have been evaluated. For example, imaging management module 106 of FIG. 1 may be operative to determine whether all of the pixel intensity values in pixel intensity value array 108 have been evaluated. If it is determined that all of the pixel intensity values in the pixel intensity value array have not been evaluated, flow may return to 304, where a next pixel intensity value may be selected for evaluation. If it is determined that all of the pixel intensity values in the pixel intensity value array have been evaluated, the logic flow may end.

Figure 4:
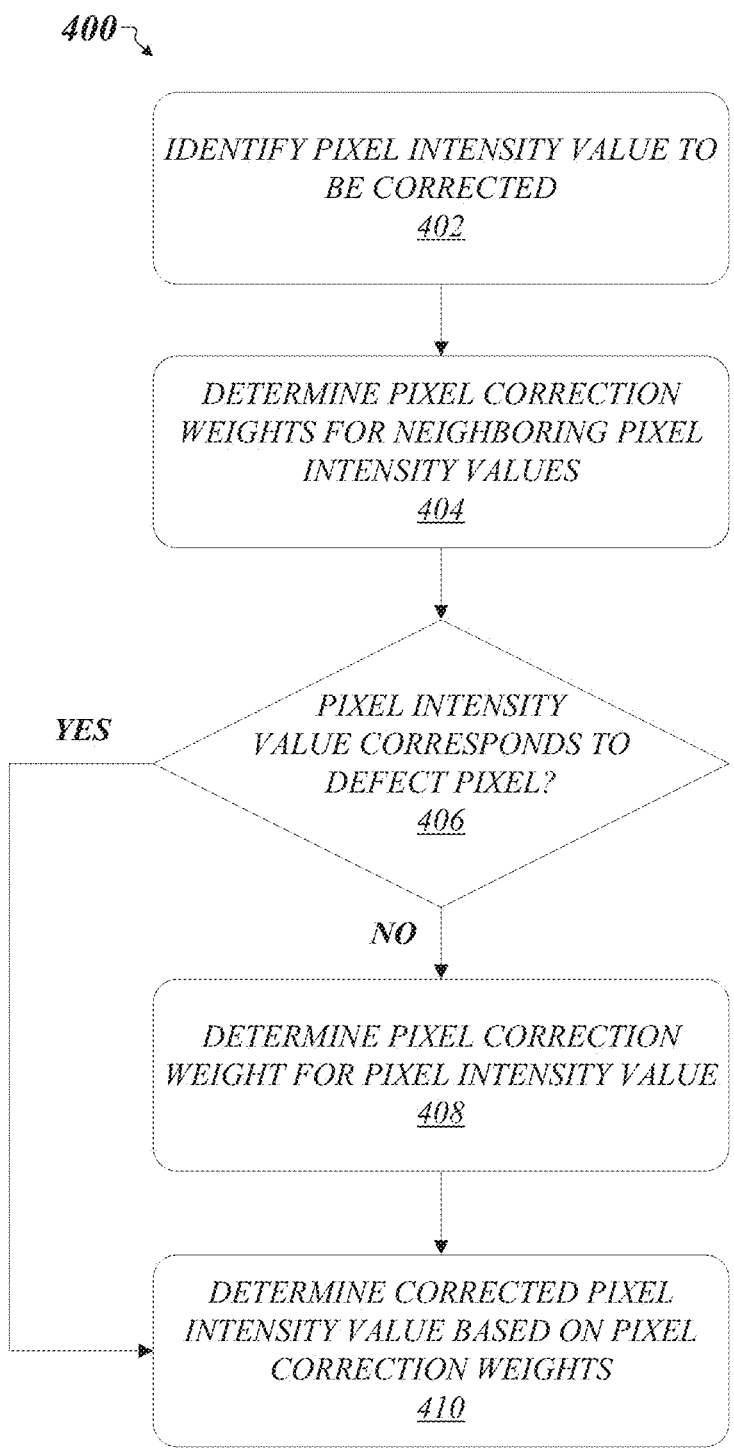
FIG. 4 illustrates one embodiment of a second logic flow.

FIG. 4 illustrates one embodiment of a logic flow 400, which may be representative of the operations executed by one or more embodiments described herein. More particularly, logic flow 400 may comprise an example of a process for determining a corrected pixel intensity value. As shown in logic flow 400, a pixel intensity value to be corrected by may be identified at 402. For example, imaging management module 106 of FIG. 1 may be operative to determine that pixel intensity value 110 is to be corrected. At 404, pixel correction weights for neighboring pixel intensity values associated with the pixel intensity value may be determined. For example, imaging management module 106 of FIG. 1 may be operative to determine pixel correction weights 120 for neighboring pixel intensity values 112. At 406, it may be determined whether the pixel intensity value to be corrected corresponds to a defect pixel. For example, imaging management module 106 of FIG. 1 may be operative to determine whether pixel intensity value 110 corresponds to a defect pixel based on image data buffer 126 and/or defect pixel information 128.

If it is determined that the pixel intensity value to be corrected does not correspond to a defect pixel, flow may pass to 408. At 408, a pixel correction weight may be determined for the pixel intensity value to be corrected. For example, imaging management module 106 may be operative to determine a pixel correction weight 120 for pixel intensity value 110. Flow may then pass to 410. If, at 406, it is determined that the pixel intensity value to be corrected corresponds to a defect pixel, flow may pass directly to 410. At 410, a corrected pixel intensity value may be determined based on the pixel correction weights. In some embodiments, the corrected pixel intensity value may comprise a weighted average determined based on the neighboring pixel intensity values and the pixel correction weights. For example, imaging management module 106 of FIG. 1 may be operative to determine corrected pixel intensity value 124 as a weighted average based on neighboring pixel intensity values 112 and pixel correction weights 120. In various such embodiments in which it has been determined that the pixel intensity value to be corrected does not correspond to a defect pixel, the corrected pixel intensity value may comprise a weighted average determined based also on the pixel intensity value to be corrected and the pixel correction weight for the pixel intensity value to be corrected. For example, if imaging management module 106 of FIG. 1 has determined that pixel intensity value 110 does not correspond to a defect pixel, it may be operative to determine corrected pixel intensity value 124 as a weighted average based on pixel intensity value 110, neighboring pixel intensity values 112, and the pixel correction weights 120 for pixel intensity value 110 and neighboring pixel intensity values 112. The embodiments are not limited in this context.

Figure 5:
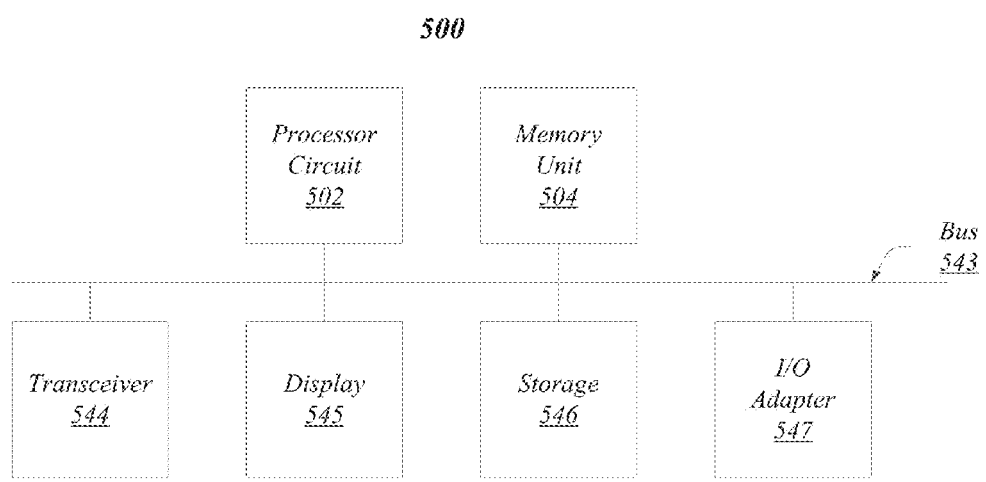
FIG. 5 illustrates one embodiment of a second system.

FIG. 5 illustrates one embodiment of a system 500. In various embodiments, system 500 may be representative of a system or architecture suitable for use with one or more embodiments described herein, such as apparatus 100 and/or system 140 of FIG. 1, logic flow 300 of FIG. 3, and/or logic flow 400 of FIG. 4. The embodiments are not limited in this respect.

As shown in FIG. 5, system 500 may include multiple elements. One or more elements may be implemented using one or more circuits, components, registers, processors, software subroutines, modules, or any combination thereof, as desired for a given set of design or performance constraints. Although FIG. 5 shows a limited number of elements in a certain topology by way of example, it can be appreciated that more or less elements in any suitable topology may be used in system 500 as desired for a given implementation. The embodiments are not limited in this context.

In various embodiments, system 500 may include a processor circuit 502. Processor circuit 502 may be implemented using any processor or logic device, and may be the same as or similar to processor circuit 102 of FIG. 1.

In one embodiment, system 500 may include a memory unit 504 to couple to processor circuit 502. Memory unit 504 may be coupled to processor circuit 502 via communications bus 543, or by a dedicated communications bus between processor circuit 502 and memory unit 504, as desired for a given implementation. Memory unit 504 may be implemented using any machine-readable or computer-readable media capable of storing data, including both volatile and non-volatile memory, and may be the same as or similar to memory unit 104 of FIG. 1. In some embodiments, the machine-readable or computer-readable medium may include a non-transitory medium. The embodiments are not limited in this context.

In various embodiments, system 500 may include a transceiver 544. Transceiver 544 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 544 may operate in accordance with one or more applicable standards in any version. The embodiments are not limited in this context.

In various embodiments, system 500 may include a display 545. Display 545 may comprise any display device capable of displaying information received from processor circuit 502, and may be the same as or similar to display 145 of FIG. 1. The embodiments are not limited in this context.

In various embodiments, system 500 may include storage 546. Storage 546 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 546 may include technology to increase the storage performance enhanced protection for valuable digital media when multiple hard drives are included, for example. Further examples of storage 546 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 500 may include one or more I/O adapters 547. Examples of I/O adapters 547 may include Universal Serial Bus (USB) ports/adapters, IEEE 1394 Firewire ports/adapters, and so forth. The embodiments are not limited in this context.

Figure 6:
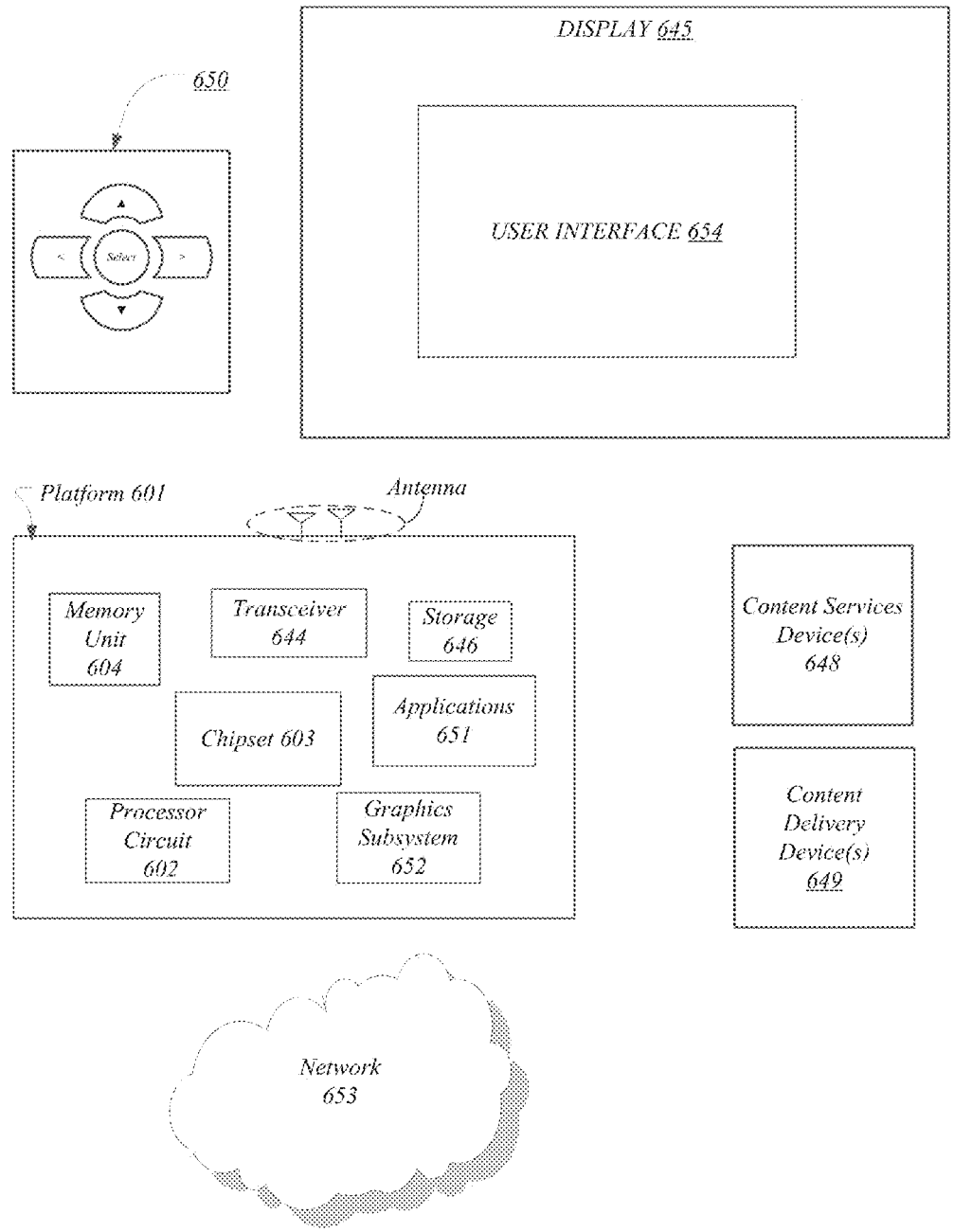
FIG. 6 illustrates one embodiment of a third system.

FIG. 6 illustrates an embodiment of a system 600. In various embodiments, system 600 may be representative of a system or architecture suitable for use with one or more embodiments described herein, such as apparatus 100 and/or system 140 of FIG. 1, logic flow 300 of FIG. 3, logic flow 400 of FIG. 4, and/or system 500 of FIG. 5. The embodiments are not limited in this respect.

As shown in FIG. 6, system 600 may include multiple elements. One or more elements may be implemented using one or more circuits, components, registers, processors, software subroutines, modules, or any combination thereof, as desired for a given set of design or performance constraints. Although FIG. 6 shows a limited number of elements in a certain topology by way of example, it can be appreciated that more or less elements in any suitable topology may be used in system 600 as desired for a given implementation. The embodiments are not limited in this context.

In embodiments, system 600 may be a media system although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 600 includes a platform 601 coupled to a display 645. Platform 601 may receive content from a content device such as content services device(s) 648 or content delivery device(s) 649 or other similar content sources. A navigation controller 650 including one or more navigation features may be used to interact with, for example, platform 601 and/or display 645. Each of these components is described in more detail below.

In embodiments, platform 601 may include any combination of a processor circuit 602, chipset 603, memory unit 604, transceiver 644, storage 646, applications 651, and/or graphics subsystem 652. Chipset 603 may provide intercommunication among processor circuit 602, memory unit 604, transceiver 644, storage 646, applications 651, and/or graphics subsystem 652. For example, chipset 603 may include a storage adapter (not depicted) capable of providing intercommunication with storage 646.

Processor circuit 602 may be implemented using any processor or logic device, and may be the same as or similar to processor circuit 502 in FIG. 5.

Memory unit 604 may be implemented using any machine-readable or computer-readable media capable of storing data, and may be the same as or similar to memory unit 504 in FIG. 5.

Transceiver 644 may include one or more radios capable of transmitting and receiving signals using various suitable wireless communications techniques, and may be the same as or similar to transceiver 544 in FIG. 5.

Display 645 may include any television type monitor or display, and may be the same as or similar to display 545 in FIG. 5.

Storage 646 may be implemented as a non-volatile storage device, and may be the same as or similar to storage 546 in FIG. 5.

Graphics subsystem 652 may perform processing of images such as still or video for display. Graphics subsystem 652 may be a graphics processing unit (GPU) or a visual processing unit (VPU), for example. An analog or digital interface may be used to communicatively couple graphics subsystem 652 and display 645. For example, the interface may be any of a High-Definition Multimedia Interface, DisplayPort, wireless HDMI, and/or wireless HD compliant techniques. Graphics subsystem 652 could be integrated into processor circuit 602 or chipset 603. Graphics subsystem 652 could be a stand-alone card communicatively coupled to chipset 603.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 648 may be hosted by any national, international and/or independent service and thus accessible to platform 601 via the Internet, for example. Content services device(s) 648 may be coupled to platform 601 and/or to display 645. Platform 601 and/or content services device(s) 648 may be coupled to a network 653 to communicate (e.g., send and/or receive) media information to and from network 653. Content delivery device(s) 649 also may be coupled to platform 601 and/or to display 645.

In embodiments, content services device(s) 648 may include a cable television box, personal computer, network, telephone, Internet enabled devices or appliance capable of delivering digital information and/or content, and any other similar device capable of unidirectionally or bidirectionally communicating content between content providers and platform 601 and/display 645, via network 653 or directly. It will be appreciated that the content may be communicated unidirectionally and/or bidirectionally to and from any one of the components in system 600 and a content provider via network 653. Examples of content may include any media information including, for example, video, music, medical and gaming information, and so forth.

Content services device(s) 648 receives content such as cable television programming including media information, digital information, and/or other content. Examples of content providers may include any cable or satellite television or radio or Internet content providers. The provided examples are not meant to limit embodiments of the disclosed subject matter.

In embodiments, platform 601 may receive control signals from navigation controller 650 having one or more navigation features. The navigation features of navigation controller 650 may be used to interact with a user interface 654, for example. In embodiments, navigation controller 650 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 650 may be echoed on a display (e.g., display 645) by movements of a pointer, cursor, focus ring, or other visual indicators displayed on the display. For example, under the control of software applications 651, the navigation features located on navigation controller 650 may be mapped to virtual navigation features displayed on user interface 654. In embodiments, navigation controller 650 may not be a separate component but integrated into platform 601 and/or display 645. Embodiments, however, are not limited to the elements or in the context shown or described herein.

In embodiments, drivers (not shown) may include technology to enable users to instantly turn on and off platform 601 like a television with the touch of a button after initial boot-up, when enabled, for example. Program logic may allow platform 601 to stream content to media adaptors or other content services device(s) 648 or content delivery device(s) 649 when the platform is turned "off." In addition, chip set 603 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 600 may be integrated. For example, platform 601 and content services device(s) 648 may be integrated, or platform 601 and content delivery device(s) 649 may be integrated, or platform 601, content services device(s) 648, and content delivery device(s) 649 may be integrated, for example. In various embodiments, platform 601 and display 645 may be an integrated unit. Display 645 and content service device(s) 648 may be integrated, or display 645 and content delivery device(s) 649 may be integrated, for example. These examples are not meant to limit the disclosed subject matter.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 601 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
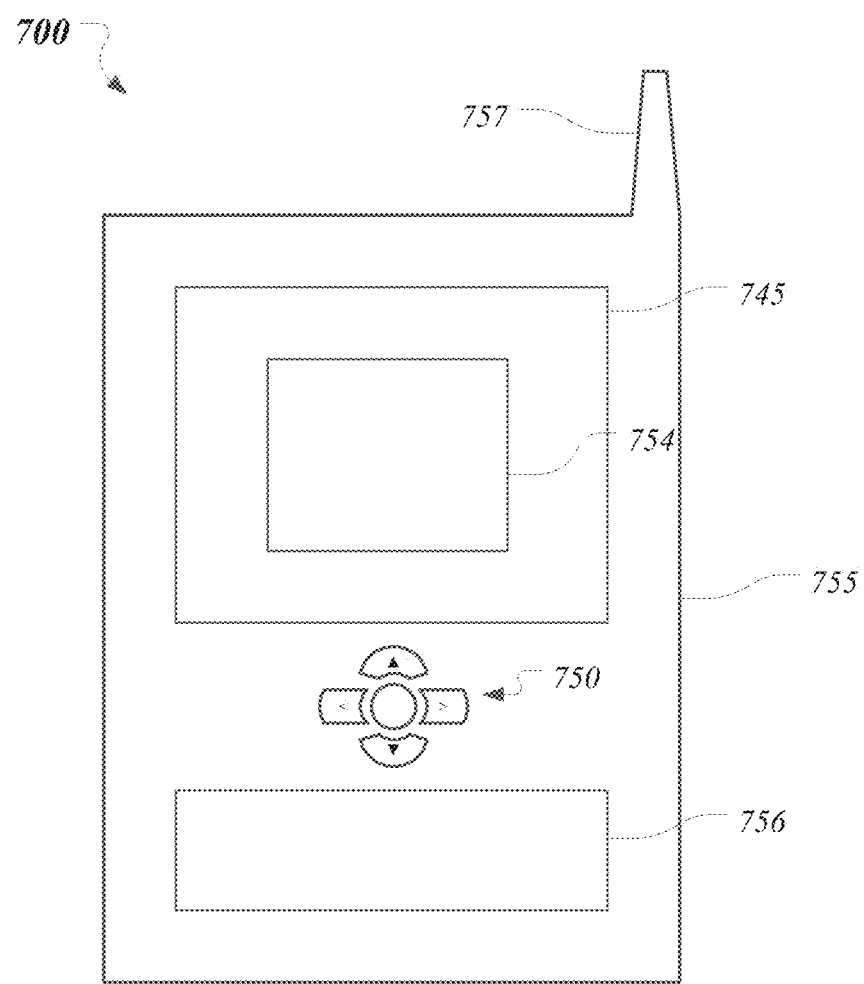
FIG. 7 illustrates one embodiment of a device.

As described above, system 600 may be embodied in varying physical styles or form factors. FIG. 7 illustrates embodiments of a small form factor device 700 in which system 600 may be embodied. In embodiments, for example, device 700 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may include a display 745, a navigation controller 750, a user interface 754, a housing 755, an I/O device 756, and an antenna 757. Display 745 may include any suitable display unit for displaying information appropriate for a mobile computing device, and may be the same as or similar to display 645 in FIG. 6.

Navigation controller 750 may include one or more navigation features which may be used to interact with user interface 754, and may be the same as or similar to navigation controller 650 in FIG. 6. I/O device 756 may include any suitable I/O device for entering information into a mobile computing device. Examples for I/O device 756 may include an alphanumeric keyboard, a numeric keypad, a touch pad, input keys, buttons, switches, rocker switches, microphones, speakers, voice recognition device and software, and so forth. Information also may be entered into device 700 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments.

Example 1 is at least one machine-readable medium comprising a plurality of instructions for image processing that, in response to being executed on a computing device, cause the computing device to: determine an intensity value for a pixel in an image sensor pixel array; determine a pixel intensity deviation for the pixel comprising a difference between the intensity value for the pixel and a composite intensity value for a pixel neighborhood of the pixel; determine a pixel correction threshold for the pixel; and when the pixel intensity deviation exceeds the pixel correction threshold, determine a corrected intensity value for the pixel.

In Example 2, the at least one machine-readable medium of Example 1 may optionally comprise instructions for image processing that, in response to being executed on a computing device, cause the computing device to determine the pixel correction threshold for the pixel based on a statistical noise model for the image sensor pixel array.

In Example 3, the at least one machine-readable medium of any one of Examples 1-2 may optionally comprise instructions for image processing that, in response to being executed on a computing device, cause the computing device to determine the pixel correction threshold for the pixel based on the intensity value for the pixel and on a gain for the pixel.

In Example 4, the at least one machine-readable medium of any one of Examples 1-3 may optionally comprise instructions for image processing that, in response to being executed on a computing device, cause the computing device to: determine a plurality of neighboring pixel intensity values for a plurality of neighboring pixels in the pixel neighborhood; determine a plurality of pixel correction weights for the plurality of neighboring pixel intensity values; and determine the corrected intensity value based on the plurality of pixel correction weights and the plurality of neighboring pixel intensity values.

In Example 5, the at least one machine-readable medium of Example 4 may optionally comprise instructions for image processing that, in response to being executed on a computing device, cause the computing device to: reduce the pixel correction weights for neighboring pixel intensity values that differ from the composite intensity value by an amount greater than the pixel correction threshold; and increase the pixel correction weights for neighboring pixel intensity values that differ from the composite intensity value by an amount less than the pixel correction threshold.

In Example 6, the at least one machine-readable medium of any one of Examples 4-5 may optionally comprise instructions for image processing that, in response to being executed on a computing device, cause the computing device to: determine whether the pixel comprises a defect pixel; and when the pixel does not comprise a defect pixel, determine a pixel correction weight for the pixel and determine the corrected intensity value for the pixel based on the pixel correction weight for the pixel, the plurality of pixel correction weights for the plurality of neighboring pixel intensity values, the intensity value for the pixel, and the plurality of neighboring pixel intensity values.

In Example 7, the at least one machine-readable medium of any one of Examples 4-6 may optionally comprise instructions for image processing that, in response to being executed on a computing device, cause the computing device to determine the plurality of pixel correction weights such that a filter noise gain is approximately constant across an image sensor region comprising the pixel neighborhood.

In Example 8, the intensity value for the pixel in any one of Examples 1-7 may optionally comprise a local luminosity estimate for the pixel.

In Example 9, the at least one machine-readable medium of any one of Examples 1-8 may optionally comprise instructions for image processing that, in response to being executed on a computing device, cause the computing device to determine the composite intensity value for the pixel neighborhood based on local luminosity estimates for pixels in the pixel neighborhood.

In Example 10, the pixel in any one of Examples 1-9 may optionally comprise a central pixel of the pixel neighborhood.

In Example 11, the pixel neighborhood in any one of Examples 1-10 may optionally comprise five pixel rows and five pixel columns.

In Example 12, the image sensor pixel array in any one of Examples 1-11 may optionally be coupled to a Bayer filter mosaic.

In Example 13, the image sensor pixel array in any one of Examples 1-12 may optionally comprise a complementary metal-oxide-semiconductor (CMOS) image sensor pixel array.

In Example 14, the image sensor pixel array in any one of Examples 1-13 may optionally comprise a charge-coupled device (CCD) image sensor pixel array.

In Example 15, the image sensor pixel array in any one of Examples 1-14 may optionally comprise a hybrid charge-coupled device/complementary metal-oxide-semiconductor (CMOS/CCD) image sensor pixel array.

Example 16 is an image processing apparatus, comprising: a processor circuit; and an imaging management module for execution on the processor circuit to: determine an intensity value for a pixel in an image sensor pixel array; determine a pixel intensity deviation for the pixel comprising a difference between the intensity value for the pixel and a composite intensity value for a pixel neighborhood of the pixel; determine a pixel correction threshold for the pixel; and when the pixel intensity deviation exceeds the pixel correction threshold, determine a corrected intensity value for the pixel.

In Example 17, the imaging management module of Example 16 may optionally be for execution on the processor circuit to determine the pixel correction threshold for the pixel based on a statistical noise model for the image sensor pixel array.

In Example 18, the imaging management module of any one of Examples 16-17 may optionally be for execution on the processor circuit to determine the pixel correction threshold for the pixel based on the intensity value for the pixel and on a gain for the pixel.

In Example 19, the imaging management module of any one of Examples 16-18 may optionally be for execution on the processor circuit to: determine a plurality of neighboring pixel intensity values for a plurality of neighboring pixels in the pixel neighborhood; determine a plurality of pixel correction weights for the plurality of neighboring pixel intensity values; and determine the corrected intensity value based on the plurality of pixel correction weights and the plurality of neighboring pixel intensity values.

In Example 20, the imaging management module of Example 19 may optionally be for execution on the processor circuit to: reduce the pixel correction weights for neighboring pixel intensity values that differ from the composite intensity value by an amount greater than the pixel correction threshold; and increase the pixel correction weights for neighboring pixel intensity values that differ from the composite intensity value by an amount less than the pixel correction threshold.

In Example 21, the imaging management module of any one of Examples 19-20 may optionally be for execution on the processor circuit to: determine whether the pixel comprises a defect pixel; and when the pixel does not comprise a defect pixel, determine a pixel correction weight for the pixel and determine the corrected intensity value for the pixel based on the pixel correction weight for the pixel, the plurality of pixel correction weights for the plurality of neighboring pixel intensity values, the intensity value for the pixel, and the plurality of neighboring pixel intensity values.

In Example 22, the imaging management module of any one of Examples 19-21 may optionally be for execution on the processor circuit to determine the plurality of pixel correction weights such that a filter noise gain is approximately constant across an image sensor region comprising the pixel neighborhood.

In Example 23, the intensity value for the pixel in any one of Examples 16-22 may optionally comprise a local luminosity estimate for the pixel.

In Example 24, the imaging management module of any one of Examples 16-23 may optionally be for execution on the processor circuit to determine the composite intensity value for the pixel neighborhood based on local luminosity estimates for pixels in the pixel neighborhood.

In Example 25, the pixel in any one of Examples 16-24 may optionally comprise a central pixel of the pixel neighborhood.

In Example 26, the pixel neighborhood in any one of Examples 16-25 may optionally comprise five pixel rows and five pixel columns.

In Example 27, the image sensor pixel array in any one of Examples 16-26 may optionally be coupled to a Bayer filter mosaic.

In Example 28, the image sensor pixel array in any one of Examples 16-27 may optionally comprise a complementary metal-oxide-semiconductor (CMOS) image sensor pixel array.

In Example 29, the image sensor pixel array in any one of Examples 16-28 may optionally comprise a charge-coupled device (CCD) image sensor pixel array.

In Example 30, the image sensor pixel array in any one of Examples 16-29 may optionally comprise a hybrid charge-coupled device/complementary metal-oxide-semiconductor (CMOS/CCD) image sensor pixel array.

Example 31 is an image processing method, comprising: determining an intensity value for a pixel in an image sensor pixel array; determining a pixel intensity deviation for the pixel comprising a difference between the intensity value for the pixel and a composite intensity value for a pixel neighborhood of the pixel; determining a pixel correction threshold for the pixel; and when the pixel intensity deviation exceeds the pixel correction threshold, determining a corrected intensity value for the pixel.

In Example 32, the image processing method of Example 31 may optionally comprise determining the pixel correction threshold for the pixel based on a statistical noise model for the image sensor pixel array.

In Example 33, the image processing method of any one of Examples 31-32 may optionally comprise determining the pixel correction threshold for the pixel based on the intensity value for the pixel and on a gain for the pixel.

In Example 34, the image processing method of any one of Examples 31-33 may optionally comprise: determining a plurality of neighboring pixel intensity values for a plurality of neighboring pixels in the pixel neighborhood; determining a plurality of pixel correction weights for the plurality of neighboring pixel intensity values; and determining the corrected intensity value based on the plurality of pixel correction weights and the plurality of neighboring pixel intensity values.

In Example 35, the image processing method of Example 34 may optionally comprise: reducing the pixel correction weights for neighboring pixel intensity values that differ from the composite intensity value by an amount greater than the pixel correction threshold; and increasing the pixel correction weights for neighboring pixel intensity values that differ from the composite intensity value by an amount less than the pixel correction threshold.

In Example 36, the image processing method of any one of Examples 34-35 may optionally comprise: determining whether the pixel comprises a defect pixel; and when the pixel does not comprise a defect pixel, determining a pixel correction weight for the pixel and determining the corrected intensity value for the pixel based on the pixel correction weight for the pixel, the plurality of pixel correction weights for the plurality of neighboring pixel intensity values, the intensity value for the pixel, and the plurality of neighboring pixel intensity values.

In Example 37, the image processing method of any one of Examples 34-36 may optionally comprise determining the plurality of pixel correction weights such that a filter noise gain is approximately constant across an image sensor region comprising the pixel neighborhood.

In Example 38, the intensity value for the pixel in any one of Examples 31-37 may optionally comprise a local luminosity estimate for the pixel.

In Example 39, the image processing method of any one of Examples 31-38 may optionally comprise determining the composite intensity value for the pixel neighborhood based on local luminosity estimates for pixels in the pixel neighborhood.

In Example 40, the pixel in any one of Examples 31-39 may optionally comprise a central pixel of the pixel neighborhood.

In Example 41, the pixel neighborhood in any one of Examples 31-40 may optionally comprise five pixel rows and five pixel columns.

In Example 42, the image sensor pixel array in any one of Examples 31-41 may optionally be coupled to a Bayer filter mosaic.

In Example 43, the image sensor pixel array in any one of Examples 31-42 may optionally comprise a complementary metal-oxide-semiconductor (CMOS) image sensor pixel array.

In Example 44, the image sensor pixel array in any one of Examples 31-43 may optionally comprise a charge-coupled device (CCD) image sensor pixel array.

In Example 45, the image sensor pixel array in any one of Examples 31-44 may optionally comprise a hybrid charge-coupled device/complementary metal-oxide-semiconductor (CMOS/CCD) image sensor pixel array.

Example 46 is at least one machine-readable medium comprising a plurality of instructions for image processing that, in response to being executed on a computing device, cause the computing device to perform a method according to any one of Examples 31 to 45.

Example 47 is an image processing apparatus, comprising means for performing a method according to any one of Examples 31 to 45.

Example 48 is a communications device arranged to perform a method according to any one of Examples 31 to 45.

Example 49 is an image processing system, comprising: a processor circuit; an image sensor comprising an image sensor pixel array; and an imaging management module for execution on the processor circuit to: determine an intensity value for a pixel in the image sensor pixel array; determine a pixel intensity deviation for the pixel comprising a difference between the intensity value for the pixel and a composite intensity value for a pixel neighborhood of the pixel; determine a pixel correction threshold for the pixel; and when the pixel intensity deviation exceeds the pixel correction threshold, determine a corrected intensity value for the pixel.

In Example 50, the imaging management module of Example 49 may optionally be for execution on the processor circuit to determine the pixel correction threshold for the pixel based on a statistical noise model for the image sensor pixel array.

In Example 51, the imaging management module of any one of Examples 49-50 may optionally be for execution on the processor circuit to determine the pixel correction threshold for the pixel based on the intensity value for the pixel and on a gain for the pixel.

In Example 52, the imaging management module of any one of Examples 49-51 may optionally be for execution on the processor circuit to: determine a plurality of neighboring pixel intensity values for a plurality of neighboring pixels in the pixel neighborhood; determine a plurality of pixel correction weights for the plurality of neighboring pixel intensity values; and determine the corrected intensity value based on the plurality of pixel correction weights and the plurality of neighboring pixel intensity values.

In Example 53, the imaging management module of Example 52 may optionally be for execution on the processor circuit to: reduce the pixel correction weights for neighboring pixel intensity values that differ from the composite intensity value by an amount greater than the pixel correction threshold; and increase the pixel correction weights for neighboring pixel intensity values that differ from the composite intensity value by an amount less than the pixel correction threshold.

In Example 54, the imaging management module of any one of Examples 52-53 may optionally be for execution on the processor circuit to: determine whether the pixel comprises a defect pixel; and when the pixel does not comprise a defect pixel, determine a pixel correction weight for the pixel and determine the corrected intensity value for the pixel based on the pixel correction weight for the pixel, the plurality of pixel correction weights for the plurality of neighboring pixel intensity values, the intensity value for the pixel, and the plurality of neighboring pixel intensity values.

In Example 55, the imaging management module of any one of Examples 52-54 may optionally be for execution on the processor circuit to determine the plurality of pixel correction weights such that a filter noise gain is approximately constant across an image sensor region comprising the pixel neighborhood.

In Example 56, the intensity value for the pixel in any one of Examples 49-55 may optionally comprise a local luminosity estimate for the pixel.

In Example 57, the imaging management module of any one of Examples 49-56 may optionally be for execution on the processor circuit to determine the composite intensity value for the pixel neighborhood based on local luminosity estimates for pixels in the pixel neighborhood.

In Example 58, the pixel in any one of Examples 49-57 may optionally comprise a central pixel of the pixel neighborhood.

In Example 59, the pixel neighborhood in any one of Examples 49-58 may optionally comprise five pixel rows and five pixel columns.

In Example 60, the image sensor pixel array in any one of Examples 49-59 may optionally be coupled to a Bayer filter mosaic.

In Example 61, the image sensor pixel array in any one of Examples 49-60 may optionally comprise a complementary metal-oxide-semiconductor (CMOS) image sensor pixel array.

In Example 62, the image sensor pixel array in any one of Examples 49-61 may optionally comprise a charge-coupled device (CCD) image sensor pixel array.

In Example 63, the image sensor pixel array in any one of Examples 49-62 may optionally comprise a hybrid charge-coupled device/complementary metal-oxide-semiconductor (CMOS/CCD) image sensor pixel array.

Example 64 is an image processing apparatus, comprising: means for determining an intensity value for a pixel in an image sensor pixel array; means for determining a pixel intensity deviation for the pixel comprising a difference between the intensity value for the pixel and a composite intensity value for a pixel neighborhood of the pixel; means for determining a pixel correction threshold for the pixel; and means for determining a corrected intensity value for the pixel when the pixel intensity deviation exceeds the pixel correction threshold.

In Example 65, the image processing apparatus of Example 64 may optionally comprise means for determining the pixel correction threshold for the pixel based on a statistical noise model for the image sensor pixel array.

In Example 66, the image processing apparatus of any one of Examples 64-65 may optionally comprise means for determining the pixel correction threshold for the pixel based on the intensity value for the pixel and on a gain for the pixel.

In Example 67, the image processing apparatus of any one of Examples 64-66 may optionally comprise: means for determining a plurality of neighboring pixel intensity values for a plurality of neighboring pixels in the pixel neighborhood; means for determining a plurality of pixel correction weights for the plurality of neighboring pixel intensity values; and means for determining the corrected intensity value based on the plurality of pixel correction weights and the plurality of neighboring pixel intensity values.

In Example 68, the image processing apparatus of Example 67 may optionally comprise: means for reducing the pixel correction weights for neighboring pixel intensity values that differ from the composite intensity value by an amount greater than the pixel correction threshold; and means for increasing the pixel correction weights for neighboring pixel intensity values that differ from the composite intensity value by an amount less than the pixel correction threshold.

In Example 69, the image processing apparatus of any one of Examples 67-68 may optionally comprise: means for determining whether the pixel comprises a defect pixel; and means for determining a pixel correction weight for the pixel and determining the corrected intensity value for the pixel based on the pixel correction weight for the pixel, the plurality of pixel correction weights for the plurality of neighboring pixel intensity values, the intensity value for the pixel, and the plurality of neighboring pixel intensity values when the pixel does not comprise a defect pixel.

In Example 70, the image processing apparatus of any one of Examples 67-69 may optionally comprise means for determining the plurality of pixel correction weights such that a filter noise gain is approximately constant across an image sensor region comprising the pixel neighborhood.

In Example 71, the intensity value for the pixel in any one of Examples 64-70 may optionally comprise a local luminosity estimate for the pixel.

In Example 72, the image processing apparatus of any one of Examples 64-71 may optionally comprise means for determining the composite intensity value for the pixel neighborhood based on local luminosity estimates for pixels in the pixel neighborhood.

In Example 73, the pixel in any one of Examples 64-72 may optionally comprise a central pixel of the pixel neighborhood.

In Example 74, the pixel neighborhood in any one of Examples 64-73 may optionally comprise five pixel rows and five pixel columns.

In Example 75, the image sensor pixel array in any one of Examples 64-74 may optionally be coupled to a Bayer filter mosaic.

In Example 76, the image sensor pixel array in any one of Examples 64-75 may optionally comprise a complementary metal-oxide-semiconductor (CMOS) image sensor pixel array.

In Example 77, the image sensor pixel array in any one of Examples 64-76 may optionally comprise a charge-coupled device (CCD) image sensor pixel array.

In Example 78, the image sensor pixel array in any one of Examples 64-77 may optionally comprise a hybrid charge-coupled device/complementary metal-oxide-semiconductor (CMOS/CCD) image sensor pixel array.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. At least one non-transitory machine-readable medium comprising a plurality of instructions that, in response to being executed on a computing device, cause the computing device to:
   determine a raw pixel intensity value for a pixel in an image sensor pixel array, the image sensor pixel array to comprise an array of photosensors to measure multiple colors of light, the pixel to correspond to one photosensor of the array of photosensors and the one photosensor to measure incident light of a particular color;
   determine a composite intensity value from a plurality of neighboring raw pixel intensity values for a plurality of neighboring pixels in a pixel neighborhood of the pixel, the plurality of neighboring pixels to be limited to pixels that correspond to photosensors of the array of photosensors that are to measure incident light of the particular color;
   determine a pixel intensity deviation for the pixel comprising a difference between the raw pixel intensity value for the pixel and the composite intensity value;
   determine a pixel correction threshold for the pixel;
   determine whether the pixel intensity deviation for the pixel exceeds the pixel correction threshold; and
   in response to a determination that the pixel intensity deviation for the pixel exceeds the pixel correction threshold, perform pixel value correction for the raw pixel intensity value, the pixel value correction to comprise:
      determining whether the pixel and the plurality of neighboring pixels comprise a defect pixel;
      when the pixel does not comprise a defect pixel, determining a corrected intensity value for the pixel using the raw pixel intensity value of the pixel;
      when the pixel comprises a defect pixel, determining a corrected intensity value for the pixel excluding the raw pixel intensity value of the pixel; and
      determining a plurality of pixel correction weights for each of the plurality of neighboring pixels excluding information from the defective pixel.

2. The at least one machine-readable medium of claim 1, comprising instructions that, in response to being executed on a computing device, cause the computing device to determine the pixel correction threshold for the pixel based on a statistical noise model for the image sensor pixel array.

3. The at least one machine-readable medium of claim 1, comprising instructions that, in response to being executed on a computing device, cause the computing device to determine the pixel correction threshold for the pixel based on the raw pixel intensity value for the pixel and on a gain for the pixel when the pixel does not comprise a defect pixel.

4. The at least one machine-readable medium of claim 1, comprising instructions that, in response to being executed on a computing device, cause the computing device to:
   determine the plurality of pixel correction weights for the plurality of neighboring raw pixel intensity values; and
   determine the corrected intensity value based on the plurality of pixel correction weights and the plurality of neighboring raw pixel intensity values.

5. The at least one machine-readable medium of claim 4, comprising instructions that, in response to being executed on a computing device, cause the computing device to:
   reduce the pixel correction weights for neighboring raw pixel intensity values that differ from the composite intensity value by an amount greater than the pixel correction threshold; and
   increase the pixel correction weights for neighboring raw pixel intensity values that differ from the composite intensity value by an amount less than the pixel correction threshold.

6. The at least one machine-readable medium of claim 4, comprising instructions that, in response to being executed on a computing device, cause the computing device to, when the pixel does not comprise a defect pixel, determine a pixel correction weight for the pixel and determine the corrected intensity value for the pixel based on the pixel correction weight for the pixel, the plurality of pixel correction weights for the plurality of neighboring raw pixel intensity values, the raw pixel intensity value for the pixel, and the plurality of neighboring pixel intensity values.

7. An apparatus, comprising:
a processor circuit; and
an imaging management module for execution on the processor circuit to:
  determine a raw pixel intensity value for a pixel in an image sensor pixel array, the image sensor pixel array to comprise an array of photosensors to measure multiple colors of light, the pixel to correspond to one photosensor of the array of photosensors and the one photosensor to measure incident light of a particular color;
  determine a composite intensity value from a plurality of neighboring raw pixel intensity values for a plurality of neighboring pixels in a pixel neighborhood of the pixel, the plurality of neighboring pixels to be limited to pixels that correspond to photosensors of the array of photosensors that are to measure incident light of the particular color;
  determine a pixel intensity deviation for the pixel comprising a difference between the raw pixel intensity value for the pixel and the composite intensity value;
  determine a pixel correction threshold for the pixel;
  determine whether the pixel intensity deviation for the pixel exceeds the pixel correction threshold; and
  in response to a determination that the pixel intensity deviation for the pixel exceeds the pixel correction threshold, perform pixel value correction for the raw pixel intensity value, the pixel value correction to comprise:
    determining whether the pixel and the plurality of neighboring pixels comprise a defect pixel;
    when the pixel does not comprise a defect pixel, determining a corrected intensity value for the pixel using the raw pixel intensity value of the pixel;
    when the pixel comprises a defect pixel, determining a corrected intensity value for the pixel excluding the raw pixel intensity value of the pixel; and
    determining a plurality of pixel correction weights for each of the plurality of neighboring pixels excluding information from the defective pixel.

8. The apparatus of claim 7, the imaging management module for execution on the processor circuit to determine the pixel correction threshold for the pixel based on a statistical noise model for the image sensor pixel array.

9. The apparatus of claim 7, the imaging management module for execution on the processor circuit to determine the pixel correction threshold for the pixel based on the raw pixel intensity value for the pixel and on a gain for the pixel when the pixel does not comprise a defect pixel.

10. The apparatus of claim 7, the imaging management module for execution on the processor circuit to:
  determine the plurality of pixel correction weights for the plurality of neighboring raw pixel intensity values; and
  determine the corrected intensity value based on the plurality of pixel correction weights and the plurality of neighboring raw pixel intensity values.

11. The apparatus of claim 10, the imaging management module for execution on the processor circuit to:
  reduce the pixel correction weights for neighboring raw pixel intensity values that differ from the composite intensity value by an amount greater than the pixel correction threshold; and
  increase the pixel correction weights for neighboring raw pixel intensity values that differ from the composite intensity value by an amount less than the pixel correction threshold.

12. A method, comprising:
  determining a raw pixel intensity value for a pixel in an image sensor pixel array, the image sensor pixel array comprising an array of photosensors to measure multiple colors of light, the pixel to correspond to one photosensor of the array of photosensors and the one photosensor to measure incident light of a particular color;
  determining a composite intensity value from a plurality of neighboring raw pixel intensity values for a plurality of neighboring pixels in a pixel neighborhood of the pixel, the plurality of neighboring pixels limited to pixels that correspond to photosensors of the array of photosensors that are to measure incident light of the particular color;
  determining a pixel intensity deviation for the pixel comprising a difference between the raw pixel intensity value for the pixel and the composite intensity value;
  determining a pixel correction threshold for the pixel;
  determining whether the pixel intensity deviation for the pixel exceeds the pixel correction threshold; and
  in response to a determination that the pixel intensity deviation for the pixel exceeds the pixel correction threshold, performing pixel value correction for the raw pixel intensity value, the pixel value correction to comprise:
    determining whether the pixel and the plurality of neighboring pixels comprise a defect pixel;
    when the pixel does not comprise a defect pixel, determining a corrected intensity value for the pixel using the raw pixel intensity value of the pixel;
    when the pixel comprises a defect pixel, determining a corrected intensity value for the pixel excluding the raw pixel intensity value of the pixel; and
    determining a plurality of pixel correction weights for each of the plurality of neighboring pixels excluding information from the defective pixel.

13. The method of claim 12, comprising determining the pixel correction threshold for the pixel based on a statistical noise model for the image sensor pixel array.

14. The method of claim 12, comprising determining the pixel correction threshold for the pixel based on the raw pixel intensity value for the pixel and on a gain for the pixel when the pixel does not comprise a defect pixel.

15. The method of claim 12, comprising:
  determining the plurality of pixel correction weights for the plurality of neighboring raw pixel intensity values; and
  determining the corrected intensity value based on the plurality of pixel correction weights and the plurality of neighboring raw pixel intensity values.

16. The method of claim 15, comprising:
  reducing the pixel correction weights for neighboring raw pixel intensity values that differ from the composite intensity value by an amount greater than the pixel correction threshold; and
  increasing the pixel correction weights for neighboring raw pixel intensity values that differ from the composite intensity value by an amount less than the pixel correction threshold.

17. A system, comprising:
a processor circuit;
an image sensor comprising an image sensor pixel array; and
an imaging management module for execution on the processor circuit to:
- determine a raw pixel intensity value for a pixel in the image sensor pixel array, the image sensor pixel array to comprise an array of photosensors to measure multiple colors of light, the pixel to correspond to one photosensor of the array of photosensors and the one photosensor to measure incident light of a particular color;
- determine a composite intensity value from a plurality of neighboring raw pixel intensity values for a plurality of neighboring pixels in a pixel neighborhood of the pixel, the plurality of neighboring pixels to be limited to pixels that correspond to photosensors of the array of photosensors that are to measure incident light of the particular color;
- determine a pixel intensity deviation for the pixel comprising a difference between the raw pixel intensity value for the pixel and the composite intensity value;
- determine a pixel correction threshold for the pixel;
- determine whether the pixel intensity deviation for the pixel exceeds the pixel correction threshold; and
- in response to a determination that the pixel intensity deviation for the pixel exceeds the pixel correction threshold, perform pixel value correction for the raw pixel intensity value, the pixel value correction to comprise:
  - determining whether the pixel and the plurality of neighboring pixels comprise a defect pixel;
  - when the pixel does not comprise a defect pixel, determining a corrected intensity value for the pixel using the raw pixel intensity value of the pixel;
  - when the pixel comprises a defect pixel, determining a corrected intensity value for the pixel excluding the raw pixel intensity value of the pixel; and
  - determining a plurality of pixel correction weights for each of the plurality of neighboring pixels excluding information from the defective pixel.

18. The system of claim 17, the imaging management module for execution on the processor circuit to determine the pixel correction threshold for the pixel based on a statistical noise model for the image sensor pixel array.

19. The system of claim 17, the imaging management module for execution on the processor circuit to determine the pixel correction threshold for the pixel based on the raw pixel intensity value for the pixel and on a gain for the pixel when the pixel does not comprise a defect pixel.

20. The system of claim 17, the imaging management module for execution on the processor circuit to:
- determine the plurality of pixel correction weights for the plurality of neighboring raw pixel intensity values; and
- determine the corrected intensity value based on the plurality of pixel correction weights and the plurality of neighboring raw pixel intensity values.

21. The system of claim 20, the imaging management module for execution on the processor circuit to:
- reduce the pixel correction weights for neighboring raw pixel intensity values that differ from the composite intensity value by an amount greater than the pixel correction threshold; and
- increase the pixel correction weights for neighboring raw pixel intensity values that differ from the composite intensity value by an amount less than the pixel correction threshold.

22. The at least one machine-readable medium of claim 5, comprising instructions that, in response to being executed on a computing device, cause the computing device to redistribute a reduced pixel correction weight among at least one other pixel correction weight.

23. The apparatus of claim 11, the imaging management module for execution on the processor circuit to redistribute a reduced pixel correction weight among at least one other pixel correction weight.

24. The method of claim 16, comprising redistributing a reduced pixel correction weight among at least one other pixel correction weight.

25. The system of claim 21, the imaging management module for execution on the processor circuit to redistribute a reduced pixel correction weight among at least one other pixel correction weight.

* * * * *